United States Patent
Lee et al.

(10) Patent No.: US 8,508,066 B2
(45) Date of Patent: Aug. 13, 2013

(54) EMERGENCY CONTROL APPARATUS AND METHOD FOR USE

(75) Inventors: Young Kook Lee, Seoul (KR); Sang Hyeon Moon, Gyeonggi-do (KR); Sung Kyu Kim, Gyeonggi-do (KR); Bum Sik Kim, Gyeonggi-do (KR); Jae Won Lee, Gyeonggi-do (KR); Tae Hwan Chung, Gyeonggi-do (KR); Chul Woo Kim, Gyeonggi-do (KR); Jin Hwan Jung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 321 days.

(21) Appl. No.: 12/778,395

(22) Filed: May 12, 2010

(65) Prior Publication Data
US 2011/0095603 A1    Apr. 28, 2011

(30) Foreign Application Priority Data
Oct. 27, 2009   (KR) .................. 10-2009-0102003

(51) Int. Cl.
*B60L 3/00*   (2006.01)
(52) U.S. Cl.
USPC .......................................... 307/9.1; 307/10.1
(58) Field of Classification Search
USPC .................................. 307/9.1, 10.1
See application file for complete search history.

(56) References Cited

U.S. PATENT DOCUMENTS

| | | | |
|---|---|---|---|
| 6,255,008 B1 * | 7/2001 | Iwase | 429/9 |
| 6,762,945 B2 * | 7/2004 | Morgen | 363/17 |
| 7,099,756 B2 | 8/2006 | Sato | |
| 7,274,116 B2 * | 9/2007 | Inoue et al. | 307/100 |
| 7,405,526 B2 * | 7/2008 | Sato | 318/139 |
| 7,786,620 B2 * | 8/2010 | Vuk et al. | 307/66 |
| 7,977,819 B2 * | 7/2011 | Kitanaka | 307/64 |
| 8,044,633 B2 * | 10/2011 | Tatematsu et al. | 318/801 |
| 8,179,067 B2 * | 5/2012 | Loudot et al. | 318/400.3 |
| 8,350,516 B2 * | 1/2013 | Takeuchi et al. | 318/800 |
| 2003/0234634 A1 * | 12/2003 | Lee | 323/241 |
| 2007/0058404 A1 * | 3/2007 | Yaguchi | 363/132 |
| 2009/0322148 A1 * | 12/2009 | Kitanaka | 307/9.1 |
| 2010/0295494 A1 * | 11/2010 | Takeuchi et al. | 318/504 |

FOREIGN PATENT DOCUMENTS

| | | |
|---|---|---|
| JP | 2003-134606 A | 5/2003 |
| KR | 10-1999-0051465 | 7/1999 |
| KR | 20-182212 | 3/2000 |
| KR | 10-2007-0030363 | 3/2007 |

* cited by examiner

*Primary Examiner* — Adi Amrany
(74) *Attorney, Agent, or Firm* — Edwards Wildman Palmer LLP; Peter F. Corless (57) ABSTRACT

The present invention provides an emergency control apparatus, and method which maintains the power flow between a battery and an inverter and the operation state of an electric vehicle in the event of failure of a bidirectional DC-DC converter connected between the battery as a power source and the inverter for operating a drive motor.

5 Claims, 7 Drawing Sheets

FIG.1

PRIOR ART

FIG.2

PRIOR ART

FIG.3

PRIOR ART

FIG.4

PRIOR ART

EMERGENCY CONTROL APPARATUS AND METHOD FOR USE

CROSS-REFERENCE TO RELATED APPLICATION

This application claims under 35 U.S.C. §119(a) the benefit of Korean Patent Application No. 10-2009-0102003 filed Oct. 27, 2009, the entire contents of which are incorporated herein by reference.

BACKGROUND (a) Technical Field

The present disclosure relates, generally, to a DC-DC converter. More particularly, it relates to an emergency control apparatus and method which maintains the operation state of an electric vehicle such as a hybrid vehicle in the event of failure of a bidirectional DC-DC converter connected between a battery as a power source and an inverter for operating a drive motor.

(b) Background Art

A hybrid vehicle, in the broad sense, means a vehicle that is driven by efficiently combining at least two different types of power sources. In most cases, the hybrid vehicle is driven by an engine which generates a rotational force by burning fuel (e.g., fossil fuel such as gasoline) and an electric motor which generates a rotational force with electric power of a battery. Such a hybrid vehicle is typically referred to as a hybrid electric vehicle (HEV).

The hybrid vehicle is a vehicle of the future which can improve fuel efficiency and reduce exhaust gas by employing the electric motor as an auxiliary power source as well as the engine as a main power source. Extensive research has been conducted to improve fuel efficiency and develop environment-friendly products.

The hybrid vehicle is driven in an electric vehicle (EV) mode, which is directed to a pure electric vehicle mode using only the power of the electric motor (or drive motor), in a hybrid electric vehicle (HEV) mode, which is an auxiliary mode using the rotational force of the drive motor as an auxiliary power source with the use of the rotational force of the engine as a main power source, or in a regenerative braking (RB) mode, in which braking energy or inertia energy of the vehicle produced by braking or during driving by inertia is recovered by power generation of the drive motor and charged in a battery.

Accordingly, the mechanical energy of the engine and the electrical energy of the battery are used together, the engine and the drive motor are operated in their optimal operation regions, and the braking energy is suitably recovered by the drive motor during braking. As a result, it is possible to improve the fuel efficiency of the vehicle and effectively use the energy.

A hybrid vehicle typically includes a battery, which repeats charge and discharge during operation of the vehicle to supply electric power required for driving the drive motor, and an inverter for rotating the drive motor by the power of the battery.

The battery supplies require electric power and is charged with electric power generated by the drive motor during regenerative braking, and the inverter inverts the phase of the electric power supplied from the battery to operate the drive motor.

Recently, a DC-DC boost-buck converter (e.g., high voltage DC-DC converter, HDC) for bidirectional power conversion has been connected between the battery and the inverter to suitably improve the performance of the hybrid vehicle. The use of this bidirectional DC-DC converter is a major trend in the hybrid vehicle industry.

Japanese Patent Publication No. 2003-134606, incorporated by reference in its entirety herein, is directed to a technique in which a bidirectional DC-DC converter is suitably connected between a battery and an inverter in a vehicle driven by a drive motor.

Figure 1:
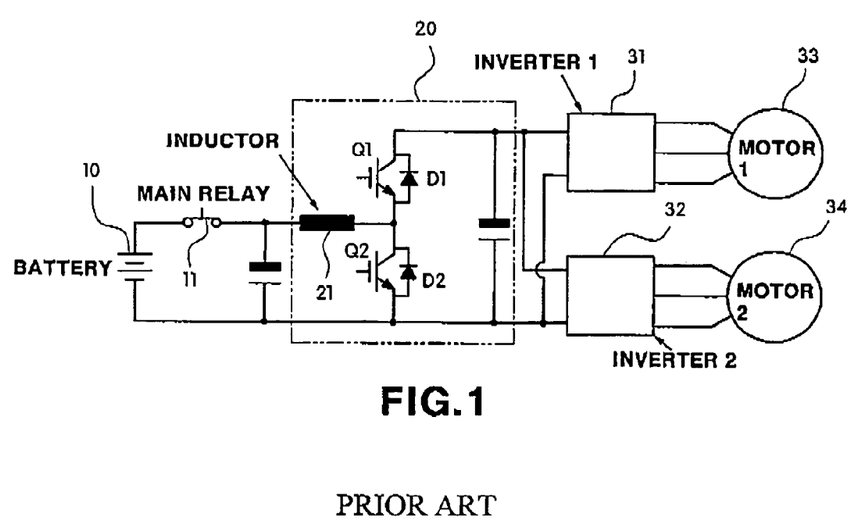
FIG. 1 is a schematic diagram of a power conversion configuration of a typical hybrid vehicle.

FIG. 1 is a schematic diagram of a power conversion configuration of a typical hybrid vehicle, in which a circuit configuration of a bidirectional DC-DC converter 20 and a connection state of a battery 10, the converter 20, inverters 31 and 32, and drive motors 33 and 34 are shown, in which the two drive motors 33 and 34 are suitably driven by the two inverters 31 and 22.

As shown in the figure, the DC-DC converter 20 preferably includes switching elements Q1 and Q2 such as transistors for controlling the power supply, diodes D1 and D2, and an inductor 21. Preferably, the switching elements Q1 and Q2 are switched on and off by control signals applied from a controller (not shown) to form a current flow path through the diodes D1 and D2, thus performing the function of supplying electric power from the inverters 31 and 32 to the battery 10 (buck operation) and the function of supplying electric power from the battery 10 to the inverters 31 and 32 (boost operation).

Accordingly the switching element Q1 and the diode D2 performs the function of supplying electric power from the inverters 31 and 32 to the battery 10 and the switching element Q2 and the diode D1 performs the function of supplying electric power from the battery 10 to the inverters 31 and 32.

Accordingly, the transistor Q1 and the diode D2 are referred to as "buck switching elements", and the transistor Q2 and the diode D1 are referred to as "boost switching elements".

The DC-DC converter 20 is suitably connected between the battery 10 and the inverters 31 and 32 converts the power from the battery 10 according to the output (operation/generation) of the drive motors 33 and 34 and supplies the converted power to the inverters 31 and 32 while a main relay 11 is turned on. Alternatively, the DC-DC converter 20 suitably converts the power (generated by the drive motors during regenerative braking) from the inverters 31 and 32 and charges the battery 10.

However, although the DC-DC converter plays an important role in the performance of the hybrid vehicle, the power conversion flow is stopped in the event of failure of the DC-DC converter, which causes serious problems such as complete discharge of the battery, discontinuation of vehicle operation, occurrence of safety accidents, etc.

That is, while the DC-DC converter operates normally, the above-described power conversion flow is suitably smooth. However, in the event that the operation of the DC-DC converter is cut off due to failure, the state of charge (SOC) of the battery may be suitably lowered, and it may have an effect on the driving performance of the vehicle (e.g., regenerative braking is impossible) and, further, the operation of the vehicle may be discontinued.

Figure 2:
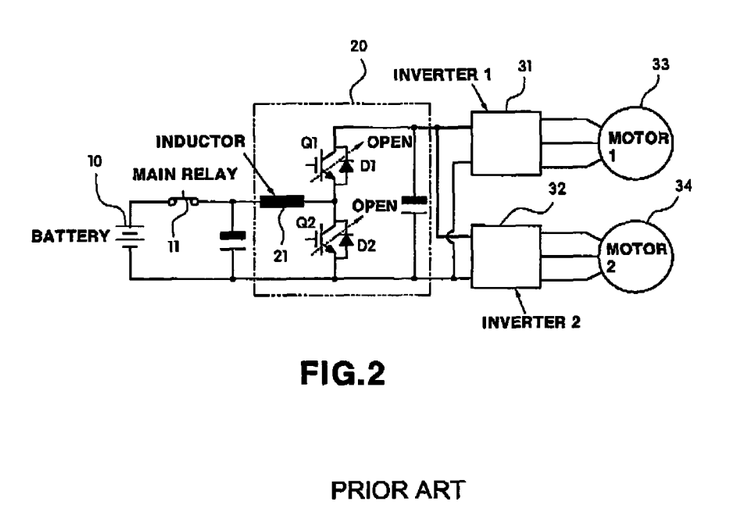
FIGS. 2-4 are diagrams illustrating exemplary problems which may occur in a prior art structure.
Figure 3:
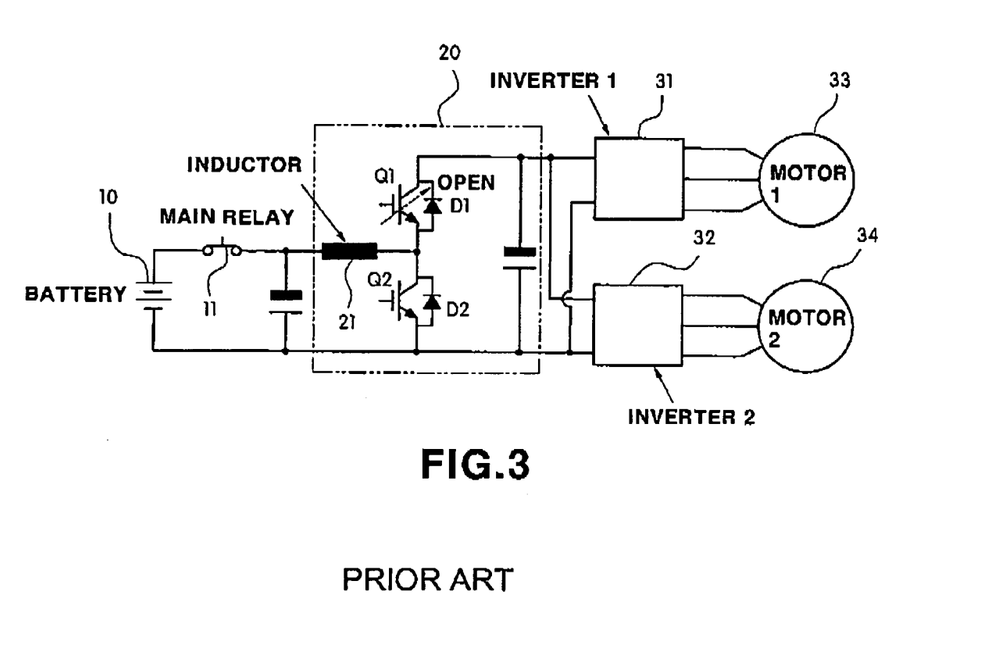
Figure 4:
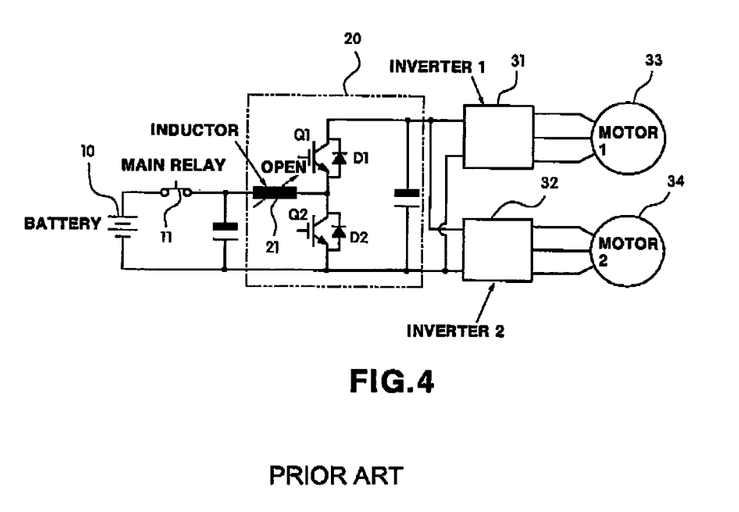

FIGS. 2 and 4 are diagrams illustrating certain problems which may occur in the prior art structure.

FIG. 2 is a diagram showing an example where the entire power module in the converter 20 is out of order. For example, when a failure occurs while all of the switching elements Q1 and Q2 and the diodes D1 and D2 are open, the power flow path between the battery 10 and the inverters 31 and 32 is completely interrupted, and as a result, the engine start-up using the inverter, the pure electric vehicle (EV) mode, and the hybrid electric vehicle (HEV) mode are all disabled. Accordingly, the operation of the hybrid vehicle is discontinued and, when a failure occurs during high speed driving, it may lead to a serious accident.

FIG. 3 is a diagram showing an example where the buck switching elements Q1 is out of order. When a failure occurs while the buck switching element Q1 is open, the power flow path from the battery 10 to the inverters 31 and 32 is maintained; however, the power flow path from the inverters 31 and 32 to the battery 10 is interrupted. Accordingly, the power of the battery is gradually exhausted, and it may lead to a situation in which the battery is completely discharged. In the worst case, the entire battery should be replaced. Moreover, since the regenerative braking or generation operation of the vehicle is completely cut off, the driving performance of the vehicle is considerably reduced.

FIG. 4 is a diagram showing an example where the inductor is out of order. When the coil of the inductor is suitably disconnected, the entire power flow path between the battery 10 and the inverters 31 and 32 is interrupted in the same manner as the failure of the entire inverter power module, which may lead to the same result as FIG. 2.

In the prior art power conversion structures (e.g., Japanese Patent Publication No. 2003-134606, incorporated by reference in its entirety herein), in which the DC-DC converter 20 is used in the above-described manner, it is impossible to solve various problems which may occur in the event of failure of the DC-DC-converter 20. Accordingly, it is necessary to provide a method for maintaining the power flow path between the battery and the inverters even in the event of failure of the DC-DC converter.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention preferably provides a fail safe apparatus and method for the failure of a bidirectional DC-DC converter. In preferred embodiment, the present invention is provided to improve the performance of an electric vehicle such as a hybrid vehicle.

In particular preferred embodiments, the present invention provides an emergency control apparatus and method which can suitably ensure driving safety by preventing interruption of power flow between a battery and an inverter and discontinuation of vehicle operation even in the event of failure of a DC/DC converter.

In further preferred embodiments, the present invention provides an emergency control apparatus and method in which a new power flow path is suitably provided between a battery and an inverter so as to maintain the operation state of an electric vehicle and solve the existing problems such as complete discharge of battery, discontinuation of vehicle operation, occurrence of safety accidents, etc. in the event of failure in a DC-DC converter.

In one preferred embodiment, the present invention provides an emergency control apparatus for suitably maintaining the operation state of a vehicle in the event of failure of a DC-DC converter, the apparatus preferably comprising a bypass circuit electrically connected between a battery and inverters; a switching element provided on the bypass circuit and controlled to selectively open and close the bypass circuit; a failure detection unit for suitably detecting a failure of a DC-DC converter connected between the battery and the inverters; and a controller for turning on the switching element to transmit electric power between the battery and the inverters through the bypass circuit when it is determined that there is a failure of the DC-DC converter based on a detection signal from the failure detection unit.

In another preferred embodiment, the bypass circuit may be provided to suitably connect an input terminal of an inductor and DC link terminals of the inverters, and the switching element may be a relay turned on and off in response to a control signal applied from the controller.

In another preferred embodiment, the present invention provides an emergency control method for maintaining the operation state of a vehicle in the event of failure of a DC-DC converter, the method comprising suitably monitoring, at a controller, a failure of the DC-DC converter based on a detection signal of a failure detection unit; and turning on the switching element to transmit electric power between the battery and the inverters through the bypass circuit when it is determined by the controller that there is a failure of the DC-DC converter.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

| | |
|---|---|
| 10: | battery |
| 20: | DC-DC converter |
| 21: | inductor |
| 22: | bypass circuit |
| 23: | switching element (auxiliary relay) |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes an emergency control apparatus for maintaining the operation state of a vehicle comprising a bypass circuit, a switching element, a failure detection unit, and a controller for turning on the switching element to transmit electric power between the battery and the inverters through the bypass circuit.

In one embodiment, the bypass circuit is electrically connected between a battery and one or more inverters.

In another embodiment, the switching element is provided on the bypass circuit and controlled to selectively open and close the bypass circuit.

In still another embodiment, the failure detection unit detects a failure of a DC-DC converter connected between the battery and the inverters.

In another further embodiment, the controller turns on the switching element to transmit electric power between the battery and the inverters through the bypass circuit when it is determined that there is a failure of the DC-DC converter based on a detection signal from the failure detection unit.

In another aspect, the present invention features an emergency control method for maintaining the operation state of a vehicle in the event of failure of a DC-DC converter comprising monitoring, at a controller, a failure of the DC-DC converter, and turning on the switching element to transmit electric power between the battery and the inverters through the bypass circuit when it is determined by the controller that there is a failure of the DC-DC converter.

In one embodiment, the monitoring is based on a detection signal of a failure detection unit.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 5:
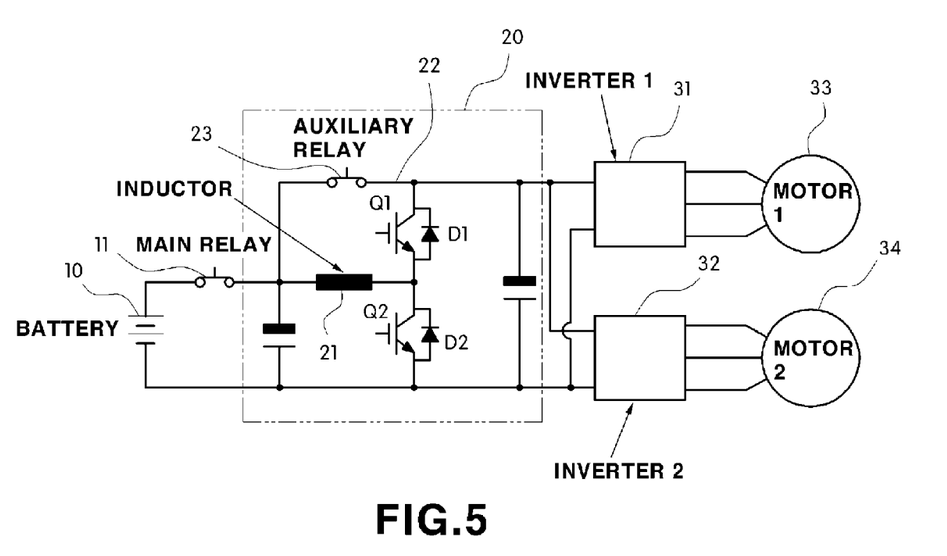
FIG. 5 is a circuit diagram in which an auxiliary of an emergency control apparatus in accordance with an exemplary embodiment of the present invention is provided.
Figure 6:
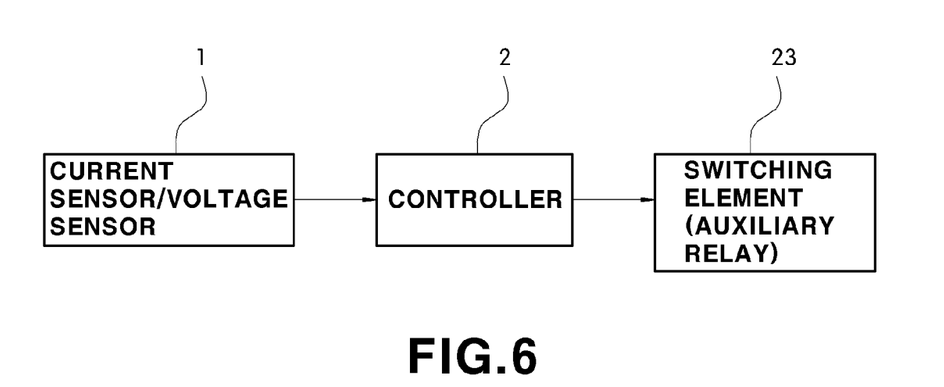
FIG. 6 is a block diagram showing the configuration of an emergency control apparatus in accordance with an exemplary embodiment of the present invention.
Figure 7:
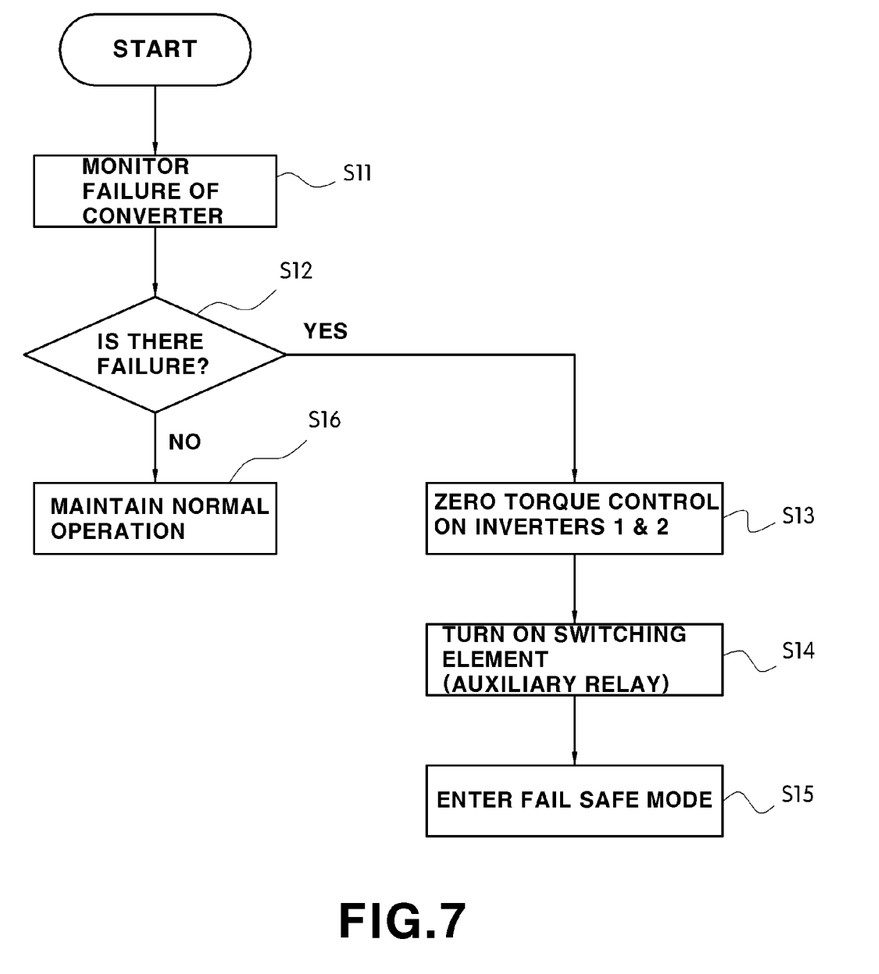
FIG. 7 is a flowchart illustrating an emergency control method in accordance with another embodiment of the present invention.

According to certain exemplary embodiments, FIG. 5 is a circuit diagram in which an auxiliary of an emergency control apparatus is provided. In other further exemplary embodiments, FIG. 6 is a block diagram showing the configuration of an emergency control apparatus. In still other exemplary embodiments, FIG. 7 is a flowchart illustrating an emergency control method.

According to preferred embodiments, the present invention provides an emergency control apparatus and method which maintains the power flow between a battery and an inverter and the operation state of an electric vehicle such as a hybrid vehicle in the event of failure of a bidirectional DC-DC converter 20 connected between a battery 10 as a power source and inverters 31 and 32 for operating drive motors 33 and 34. In particular, the present invention provides an emergency control apparatus and method which suitably detects a failure of the DC-DC converter and suitably forms an emergency power flow path between the battery and the inverters.

Preferably, this emergency power flow path is cut off during normal operation of the DC-DC converter and is suitably activated to transmit electric power between the battery and the inverters when a failure of the DC-DC converter is suitably detected, thus allowing the drive motors of the vehicle to operate (EV mode and HEV mode in a hybrid vehicle) and enabling regenerative braking even in the event of failure of the DC-DC converter.

In one exemplary embodiment, for example referring to FIG. 5, a circuit configuration of a bidirectional DC-DC converter 20 and a connection state of a battery 10, the converter 20, inverters 31 and 32, and drive motors 33 and 34 are shown, in which the two drive motors 33 and 34 are suitably driven by the two inverters 31 and 22.

Preferably, the DC-DC converter 20 includes switching elements Q1 and Q2 such as transistors for suitably controlling the power supply, diodes D1 and D2, and an inductor 21. Preferably, the switching elements Q1 and Q2 are suitably switched on and off by control signals applied from a controller (not shown) to form a current flow path through the diodes D1 and D2, thus performing the function of supplying electric power from the inverters 31 and 32 to the battery 10 (buck operation) and the function of supplying electric power from the battery 10 to the inverters 31 and 32 (boost operation).

According to further preferred embodiments, the DC-DC converter 20 connected between the battery 10 and the inverters 31 and 32 converts the power from the battery 10 according to the output (operation/generation) of the drive motors 33 and 34 and suitably supplies the converted power to the inverters 31 and 32 while a main relay 11 is turned on. In other certain embodiments, the DC-DC converter 20 suitably converts the power (generated by the drive motors during regenerative braking) from the inverters 31 and 32 and charges the battery 10.

Next, the configuration for suitably maintaining the power flow between the battery 10 and the inverters 31 and 32 in the event of failure of the DC-DC converter 20 according to further preferred embodiments of the present invention is described. For example, as shown in FIG. 5, a bypass circuit 22 is suitably connected between the battery 10 and the inverters 31 and 23 so as to form a power flow path, which is suitably separate from an existing power flow path between the battery and the inverters, and a switching element 23 capable of suitably selectively opening and closing the bypass circuit 22 in response to an external electric signal is provided on the bypass circuit 22.

Preferably, the switching element 23 selectively opens and closes the bypass circuit 22 in response to a control signal applied from a controller (denoted by 2 in FIG. 6), and as the switching element 23, a relay may be provided. Preferably, the relay 23 for selectively opening and closing the bypass circuit 22 is referred to as an auxiliary relay for distinction from the main relay 11.

As described herein, in the above-described configuration, since the bypass circuit 22 should suitably form the power flow path for transmitting electric power between the battery 10 and the inverters 31 and 32 even in the event of disconnection of the inductor or an open failure of the switching elements Q1 and Q2 or the diodes D1 and D2, it is provided to suitably connect DC link terminals of the battery 10 and the inverters 31 and 32 and, for example as shown in FIG. 5, it may be suitably provided between an input terminal of the inductor 21 at the rear of the main relay 11 and positive terminals of the DC link terminals of the inverters 31 and 32.

Accordingly, in further preferred embodiments, the auxiliary relay 23 is located between the input terminal of the inductor 21 and the positive terminals of the DC link terminals of the inverters 31 and 32 to selectively open and close the bypass circuit 22 and is turned on in the event of failure of the DC-DC converter 20 to form an emergency power flow path through the bypass circuit 22.

In further preferred embodiments, the auxiliary relay 23 for the power flow through the bypass circuit 22 is turned on only when a failure of the DC-DC converter 20 is detected. Accordingly, the emergency control apparatus of the present invention, for example as shown in FIG. 6, preferably includes a failure detection unit 1 for suitably detecting a failure of the DC-DC converter 20 in FIG. 5 and a controller 2 for suitably turning on the switching element (i.e., auxiliary relay) 23 to suitably transmit electric power through the bypass circuit 22 in FIG. 5 when it is determined that there is a failure of the DC-DC converter 20 based on a detection signal from the failure detection unit 1.

In further preferred embodiments, the failure detection unit 1 may be a current sensor or a voltage sensor suitably provided at input and output terminals of the DC-DC converter 20, and the controller 2 suitably determines whether there is a failure of the DC-DC converter 20 based on a current value or a voltage value detected by the current sensor or the voltage sensor.

In further preferred embodiments, in the event of failure of the DC-DC converter 20, the output voltage of the converter is not smoothly controlled or the current does not flow through the DC-DC converter 20. Accordingly, the controller 2 suitably determines a failure of the DC-DC converter 20 when the current does not flow or when an abnormal current or an abnormal voltage (e.g., a rapid change in voltage) is suitably detected from the detection value of the current sensor or the voltage sensor.

Preferably, when a failure of the DC-DC converter 20 is suitably detected in the above-described manner, the controller 2 outputs a control signal for fail safe operation. In particular preferred embodiments, the controller 2 outputs a control signal for turning on the switching element 23 of the bypass circuit 22, thus allowing the electric power to flow through the bypass circuit 22.

Accordingly, in further preferred embodiments, when the switching circuit 23 of the bypass circuit 22 is turned on, the electric power can flow through the bypass circuit 22, and thereby the fail safe mode is suitably enabled, that is, the electric power can be transmitted through the bypass circuit 22, thus solving the existing problems due to the failure of the DC-DC converter.

Preferably, in a hybrid vehicle, for example, the engine start-up using the inverter, the pure electric vehicle (EV) mode, and the hybrid electric vehicle (HEV) mode are suitably enabled even in the event of failure of the converter, thus maintaining the operation state of the vehicle.

Accordingly, since the electric power can be suitably transmitted between the battery and the inverters, the engine can be suitably started by the motor, the vehicle can be suitably driven by the motor using the power of the battery, and the battery can be suitably charged with the regenerative braking energy.

In another exemplary embodiment, when a failure of the DC-DC converter 20 is detected, the controller 2 may stop the operation of the DC-DC converter 20 to enter the fail safe mode, temporarily stop the operation of the inverters 31 and 32 such that the output of the electric power generated during regenerative braking through the inverters 31 and 32 is stopped, turn on the switching element 23 of the bypass circuit 22, and then restart the regenerative braking of the inverters 31 and 32.

Preferably, the controller 2 controls the respective inverters 31 and 32 to produce zero torque so as to temporarily stop the output of the electric power generated during regenerative braking through the inverters 31 and 32, which may be achieved by turning off the inverter switches by the controller 2.

Further, in the event of failure of the DC-DC converter, when the relay is forcibly turned off while the current flows through the relay or, on the contrary, when the relay is forcibly turned on while the current flows through the circuit, the relay may be suitably damaged or melted (e.g., permanent short-circuit) due to electric impact.

Accordingly, in certain exemplary embodiments, when the relay is suitably turned on or off while the current flows through the circuit, the relay may be damaged. Therefore, in further preferred embodiments, it is necessary to suitably minimize the current flowing through the relay before the relay is forcibly turned on or off, thus preventing the relay from being damaged.

Preferably, in order to minimize the current flowing through the relay, the output power of the battery, the inverter, or the converter is suitably minimized while maintaining the rotational speed of the motor, which is the zero torque control (the output power of the inverter or the motor is determined by multiplying the rotational speed of the motor by the output torque). Preferably, if the output torque of the motor is 0 (zero) even though the motor rotates, it is possible to make the output power of the inverter to be substantially zero.

Accordingly, in the present invention, the output power of the motor is suitably minimized under the zero torque control and then the switching element 23 (i.e., auxiliary relay) is turned on. As a result, it is possible to enter the fail safe mode after detecting the failure of the converter without any failure of the auxiliary relay.

In certain exemplary embodiments, referring to FIG. 7 for example, the controller suitably monitors a failure of the converter through the failure detection unit (S11) and, when a failure of the converter is suitably detected (S12), controls the respective inverters under zero torque control (S13). Then, the controller turns on the auxiliary relay (i.e., switching element) (S14) to enter the fail safe mode (S15).

Accordingly, the present invention stops the operation of the converter in the event of failure of the converter and turns on the switching element of the bypass circuit to form the emergency power flow path, thus suitably maintaining the operation state of the vehicle and solving the existing problems due to the failure of the DC-DC converter.

As described herein, according to the emergency control apparatus and method of the present invention, with the addition of only the bypass circuit and the relay to the DC-DC converter, it is possible to suitably implement the fail safe function which is provided for the failure of the DC-DC converter and to suitably ensure the driving safety by preventing the interruption of the power flow between the battery and the inverter and the discontinuation of vehicle operation even in the event of failure of the DC/DC converter.

Preferably, the present invention provides the emergency power flow path between the battery and the inverter so as to suitably maintain the operation state of the vehicle and solve the existing problems such as complete discharge of battery, discontinuation of vehicle operation, occurrence of safety accidents, etc. in the event of failure in the DC-DC converter.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An emergency control apparatus for maintaining the operation state of a vehicle in the event of failure of a DC-DC converter, the apparatus comprising:
    a main switching element electrically connected between an input terminal of an inductor and a battery;
    a bypass circuit electrically connected between a battery and inverters;
    an auxiliary switching element provided on the bypass circuit and controlled to selectively open and close the bypass circuit;
    a failure detection unit that is configured to detect a failure of a DC-DC converter connected between the battery and the inverters wherein the failure detection unit is a current sensor or a voltage sensor provided at input and output terminals of the DC-DC converter; and
    a controller that is configured to control inverters under zero torque control to minimize output power of drive motors and then turn on the auxiliary switching element to transmit electric power between the battery and the inverters through the bypass circuit when determined determination is made by the controller that there is a failure of the DC-DC converter based on a detection signal from the failure detection unit, wherein the controller determines there is a failure in the DC-DC converter when current is not detected by one or more current sensors, and when an abnormal current or voltage is detected based upon a detection signal from the current sensor or the voltage sensor, respectively, due to disconnection of the inductor or a failed opening of any of a plurality of switching elements or any diodes in the DC-DC converter,
    wherein the bypass circuit is provided to connect an input terminal of the inductor provided at the rear of the main switching element and positive terminals of DC link terminals of the inverters, so that the bypass circuit is cut off during normal operation of the DC-DC converter and is activated to transmit electric power between the battery and the inverters when a failure of the DC-DC converter is detected to allow the drive motors of a vehicle to operate and enable regenerative braking.

2. The apparatus of claim 1, wherein the auxiliary and main switching elements are relays turned on and off in response to a control signal applied from the controller.

3. An emergency control method for maintaining the operation state of a vehicle in the event of failure of a DC-DC converter, the method comprising:
    monitoring, at a controller, a failure of the DC-DC converter based on a detection signal of a failure detection unit;
    controlling inverters under zero torque control to minimize an output power of a motor when it is determined by the controller that there is a failure of the DC-DC converter based on a current value or a voltage value detected by a current sensor or a voltage sensor provided at input and output terminals of the DC-DC converter, wherein the controller determines there is a failure in the DC-DC converter when current is not detected in one or more current sensors, and when an abnormal current or voltage is detected based upon a detection signal from the current sensor or the voltage sensor, respectively, due to disconnection of the inductor or a failed opening of any of a plurality of switching elements or any diodes in the DC-DC converter, and then
    turning on the switching element to transmit electric power between a battery and inverters through a bypass circuit,
    wherein the bypass circuit is provided to connect an input terminal of an inductor provided at the rear of a main switching element and positive terminals of DC link terminals of the inverters, so that the bypass circuit is cut off during normal operation of the DC-DC converter and is activated to transmit electric power between the battery and the inverters when a failure of the DC-DC converter is detected to allow drive motors of a vehicle to operate and enable regenerative braking.

4. The method of claim 3, wherein the controller temporarily stops the output of electric power generated during regenerative braking through the inverters when a failure of the DC-DC converter is detected, turns on at least one of the plurality of switching elements, and restarts the output of electric power generated during regenerative braking.

5. The method of claim 3, wherein the auxiliary and main switching elements are a relay turned on and off in response to a control signal applied from the controller.

* * * * *